3,178,459
NOVEL ANDROSTANO-[16,17-1',2']-BENZENES
John E. Pike, Kalamazoo, Mich., assignor to The Upjohn Company, Kalamazoo, Mich., a corporation of Delaware
No Drawing. Filed Mar. 21, 1963, Ser. No. 266,789
18 Claims. (Cl. 260—397.4)

This invention relates to novel steroids and to processes for their preparation and is more particularly concerned with androstano-[16,17-1',2']-benzenes and with processes for their prepartion.

This application is a continuation-in-part of my copending application Serial No. 170,262, filed January 31, 1962, now abandoned.

The novel compounds of the invention can be represented by the following formulae:

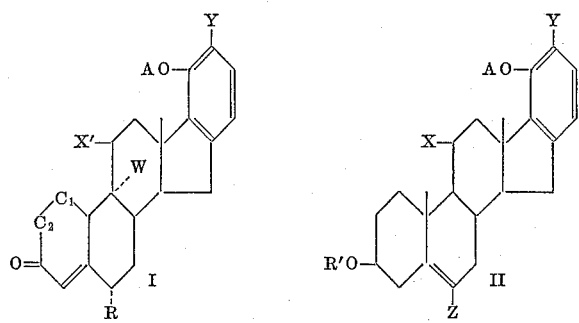

and

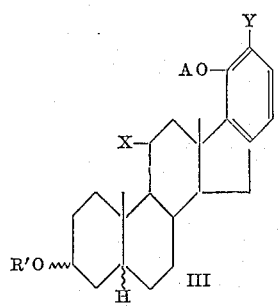

wherein A is selected from the class consisting of hydrogen, lower-alkyl, and the acyl radical of a hydrocarbon carboxylic acid containing from 1 to 12 carbon atoms, inclusive, R is selected from the class consisting of hydrogen, fluorine, and methyl, R' is selected from the class consisting of hydrogen and the acyl radical of a hydrocarbon carboxylic acid containing from 1 to 12 carbon atoms, inclusive, W is selected from the class consisting of hydrogen and fluorine, X' is an 11-substituent selected from the class consisting of hydrogen, keto, and α- and β-hydroxy, and X' and W taken together represent a 9(11)-double bond, X is an 11-substituent selected from the class consisting of hydrogen, keto, α-hydroxy, β-hydroxy, and a 9(11)-double bond, Y is selected from the class consisting of hydrogen, hydroxy, lower-alkoxy, and acyloxy wherein acyl is as hereinbefore defined, Z is selected from the class consisting of hydrogen and methyl, and —C₁—C₂— is a divalent radical selected from the class consisting of —CH₂—CH₂— and —CH=CH—.

The term "lower-alkyl" means alkyl containing from 1 to 8 carbon atoms, inclusive, such as methyl, ethyl, propyl, butyl, amyl, hexyl, heptyl, octyl, and isomeric forms thereof. The term "lower-alkoxy" means alkoxy containing from 1 to 8 carbon atoms, inclusive, such as methoxy, ethoxy, propoxy, butoxy, amyloxy, hexyloxy, heptyloxy, octyloxy, and isomeric forms thereof.

Examples of hydrocarbon carboxylic acids containing from 1 to 12 carbon atoms, inclusive, employed in the formation of the acylates of the invention, include saturated and unsaturated aliphatic acids and aromatic acids such as acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic acids, and the like.

The compounds having the Formulae I, II, and III above are novel compounds possessing anti-inflammatory, progestational, central nervous system regulating, glucocorticoid, anti-hormonal, lipid-mobilizing, hypotensive, cardiotonic, cholesterol-lowering and anti-fertility activity.

The compounds of the Formulae I, II, and III above can be prepared and administered to mammals, including valuable domestic animals, and to birds, in a wide variety of oral or parenteral dosage forms, singly, or in admixture with other active compounds. They can be associated with a pharmaceutical carrier which can be solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

In addition, the compounds of the invention exhibit high absorption of radiation in the wavelength range of 280 to 300 millimicrons and, accordingly, can be employed as effective sunburn screens when incorporated in suitable vehicles such an non-toxic oils.

Further, the compounds of the invention having the Formulae I, II, and III, wherein A is hydrogen and/or Y is hydroxy, are phenolic in character and can be employed as intermediates in the formation of resins. For example, the compounds of Formulae I, II, and III can be condensed with formaldehyde in the presence of a catalyst to form resins using procedures well known in the art for the formation of phenolformaldehyde resins; see, for example, Encyclopedia of Chemical Technology, vol. 10, p. 335 et seq., Kirk and Othmer, editors; The Interscience Encyclopedia, Inc.: New York, 1953. The resins so obtained can be employed for the wide variety of purposes for which phenol-formaldehyde resins are conventionally employed in industry and commerce.

The compounds of the invention having the Formulae I, II, and III are compounds of a novel type not hitherto described. These products all contain the following basic configuration which also shows the system of numbering employed throughout the specification:

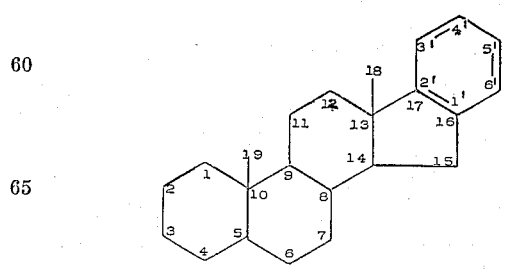

The products of the invention are all named as derivatives of androstano-[16,17-1',2']-benzene using the above system of numbering.

The compounds of the invention having the Formulae I, II, and III are prepared using the procedure which is illustrated in the following reaction scheme:

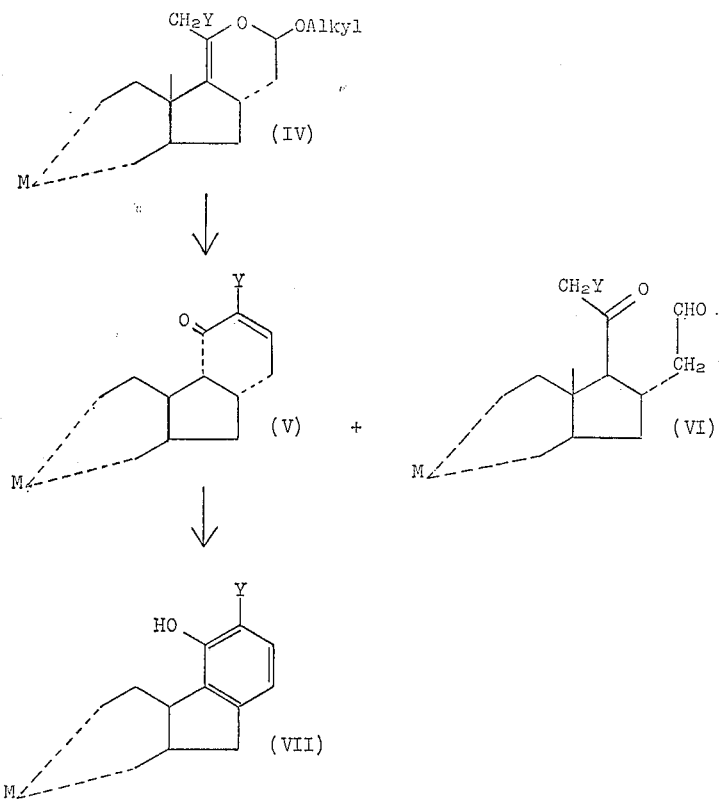

In the above formulae Y has the significance hereinbefore defined and M represents the residue of a steroid molecule in which the substituents in rings A, B, and C correspond to those in the corresponding rings in the Compounds I, II, and III.

The starting material IV employed in the above process is a 2'-substituted-6'β-alkoxy-5',6'-dihydroandrostano-[17,16α-c]-pyran which has in the A, B, and C rings (represented by the residue M) the appropriate substituents corresponding to those in the A, B, and C rings of Compounds I, II, or III. The following basic system of numbering is used throughout the specification and claims when naming a compound having the Formula IV:

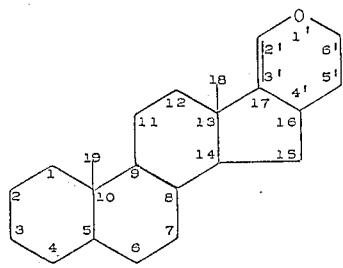

In the process of the invention, the starting Compound IV is subjected to hydrolysis in the presence of a strong non-oxidizing acid such as hydrochloric, hydrobromic, sulphuric, p-toluenesulfonic and like acids and in the presence of an inert organic solvent, advantageously a solvent miscible with water such as dioxan, tetrahydrofuran, dimethylformamide and the like. The hydrolysis is conducted advantageously at room temperature, i.e., of the order of 25° C., or at moderately elevated temperatures. There is thereby produced a mixture of the corresponding 16-(2-oxoethyl)-20-ketopregnane (VI) and the corresponding 16α - ethyl - 16b,21 - cyclopregn - 16b(21)-ene-20-one (V). Said mixture is separated by conventional procedures, for example, by counter-current distribution, chromatography, fractional crystallization, and the like.

The Compound V so obtained is then subjected to aromatization by dehydrogenation, by procedures well known in the art for this purpose, to obtain the desired Compound VII. The aromatization is carried out by heating the Compound V with a dehydrogenation catalyst such as palladium, palladium-on-charcoal, platinum oxide, Raney nickel and the like in the presence of a hydrogen acceptor such as benzene, toluene, p-cymene and the like. Advantageously, the hydrogen acceptor is employed as solvent for the reaction and the reaction is conducted at or near the boiling point of the solvent. The reaction time is generally relatively short depending upon the temperature of reaction and ease of dehydrogenation of the particular Compound V. Ordinarily, a reaction time of the order of 1 to 18 hours is sufficient to accomplish the dehydrogenation. The desired Compound VII is isolated from the reaction mixture by conventional procedures, for example, by filtration to remove the catalyst followed by evaporation of the filtrate. Purification of the Compound VII is accomplished by conventional procedures such as recrystallization, chromatography and the like.

Where the starting Compound V contains a free hydroxy group, for example, at the 3-position of the A ring, it is desirable to protect this group, for example, by acylation using conventional procedures such as by reaction with the appropriate acid anhydride in the presence of a tertiary base such as pyridine, before subjecting the Compound V to dehydrogenation. The protecting acyl group can then be removed after dehydrogenation is complete, for example, by subjecting the Compound VII to hydrolysis using conventional deacylation procedures.

The compounds of Formulae I, II, and III wherein A represents acyl are readily prepared from the corresponding compounds in which A is hydrogen by procedures conventional in the art for the acylation of phenols. For example, the free phenols (A=H) are reacted with the appropriate acid anhydride or acid halide preferably in the presence of a base such as potassium hydroxide, sodium hydroxide, pyridine and the like.

The phenolic ethers of the invention, namely, the monoethers, i.e., those compounds of Formulae I, II, and III wherein A represents lower-alkyl and the diethers, i.e., those compounds of said formulae wherein A represents lower-alkyl and Y represents lower-alkoxy, can be prepared by etherification of the corresponding free phenols. Thus, the Compounds I, II, and III wherein A is hydrogen and Y is as hereinbefore defined can be etherified by procedures well-known in the art, for example, by reaction with the appropriate alkyl halide or dialkylsulfate in the presence of an alkali such as potassium hydroxide, sodium hydroxide, sodium methoxide, sodium ethoxide and the like. Preferably, the reaction is carried out in the presence of a suitable solvent such as a lower-alkanol, for example, methanol, ethanol, isopropyl alcohol and the like, or a cyclic ether such as dioxan, tetrahydrofuran, and the like. There is thereby produced the corresponding alkyl ether (A=lower-alkyl) of Compounds I, II, and III. Where the group Y in the starting phenol represents hydroxy, this group also will be etherified and the appropriate diether (A=lower-alkyl; Y=lower-alkoxy) of I, II, and III will be produced. Similarly, where the group Y in the starting phenol represents acyloxy, said group will generally be hydrolyzed to free hydroxy and the latter will be etherified during the course of the above reaction so that the appropriate diether will again be produced.

Where the group R' is acyl in the free phenol of Formulae II and III employed as starting material for the above etherification, said group will generally be hydrolyzed to form the corresponding 3-hydroxy compound during the etherification.

The compounds of the Formulae I, II, and III wherein Y represents free hydroxy can be prepared readily by hydrolysis of the corresponding compounds in which Y represents acyloxy. The hydrolysis occurs readily and can be accomplished using aqueous or alcoholic mineral acid or aqueous or alcoholic alkali, for example, sodium hydroxide, sodium bicarbonate and the like. Such hydrolysis will also result in the deacylation of other acyloxy groups, if any, present in the starting steroid.

The compounds having the Formula V, wherein M and Y are as hereinbefore defined, are novel compounds and, in addition to their usefulness as intermediates in the above-described synthesis, possess pharmacological activity as anti-inflammatory, progestational, central nervous system regulating, glucocorticoid, anti-hormonal, lipid-mobilizing, hypotensive, cardiotonic, cholesterol-lowering, and anti-fertility agents. These compounds can be prepared and administered for the above purposes to mammals, including valuable domestic animals, and to birds, in a variety of oral or parenteral dosage forms using the procedures described above for the preparation and administration of the compounds of the Formulae I, II, and III above.

The compounds having the Formula IV which are employed as starting materials in the process described above can be prepared as described in my copending application Serial No. 170,262, filed January 31, 1962. Briefly, the preparation of the compounds of Formula IV is accomplished by reacting the corresponding substituted $\Delta^{16}$-20-ketopregnane having the formula:

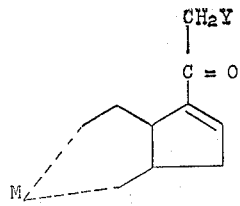

wherein M and Y have the significance hereinbefore defined, with the appropriate alkyl vinyl ether, Alkyl-O—CH=CH$_2$, under conditions normally employed in Diels-Alder reactions. Such conditions are described by, for example, Longley and Emerson, J. Am. Chem. Soc. 72, 3079, 1950; Parham and Holmquist, ibid, 73, 913, 1951; Smith et al., ibid, 73, 5267, 1961; Emerson et al., ibid, 75, 1312, 1953; Korte et al., Tetrahedron, 6, 201, 1959, Ansell and Gadsby, J. Chem. Soc. 3388, 1958; Brannock, J. Org. Chem. 25, 258, 1960.

The condensation is carried out by bringing the $\Delta^{16}$-20-keto-pregnane and the alkoxy vinyl ether together, advantageously in the presence of a catalyst, at a temperature within the range of about 25° C. to about 300° C. Any of the catalysts normally employed in the Diels-Alder type condensation (see supra) can be used in the condensation. Such catalysts include hydroquinone, aluminum chloride, boron trifluoride, stannic chloride, ferric chloride, titanium tetrachloride, and the like. The preferred catalyst is hydroquinone.

The alkoxy vinyl ether is present in the reaction mixture advantageously in excess of equimolar proportions with respect to the starting $\Delta^{16}$-20-ketopregnane and preferably in substantial excess of this amount. Advantageously, the excess of alkoxy vinyl ether serves as solvent for the reaction mixture and no other solvent need be used. However, an additional solvent can be present, if desired. Suitable solvents for this purpose are inert organic solvents such as benzene, xylene, toluene, nitrobenzene, dioxane, ether, ethanol, ethylenedichloride, acetic acid, cyclohexane, and the like.

The above reaction gives rise to a mixture of the 16α, 6'α-, 16β6'α-, 16α6'β-, and 16β,6'β- epimers of the androstano-[17,16-c]-pyran. This mixture can be separated into its components using conventional procedures such as chromatography, counter-current distribution, and the like, or any combination of these steps.

Examples of 2'-substituted-6'β-alkoxy-5',6'-dihydroandrostano-[17,16α-c]-pyrans of Formula IV which can be employed as starting materials in the process of the invention are:

$\Delta^5$-3-acetoxy-2'-methyl-6'β-methoxy-5'6'-dihydroandrostano-[17,16α-c]-pyran;
$\Delta^5$-3β-hydroxy-2'-methyl-6'β-methoxy-5',6'-dihydroandrostano-[17,16α-c]-pyran;
$\Delta^4$-3-keto-2'-methyl-6'β-methoxy-5',6'-dihydroandrostano-[17,16α-c]-pyran;
$\Delta^4$-3-keto-2',6α-dimethyl-6'β-methoxy-5',6'-dihydroandrostano-[17,16α-c]-pyran;
$\Delta^{1,4,9(11)}$-3-keto-2',6α-dimethyl-6'β-methoxy-5',6'-dihydroandrostano-[17,16α-c]-pyran;
$\Delta^5$-3β-acetoxy-2'-acetoxymethyl-6'β-methoxy-5',6' - dihydroandrostano-[17,16α-c]-pyran;
$\Delta^4$-3,11-diketo-2'-methyl-6'β-methoxy-5',6'-dihydroandrostano-[17,16α-c]-pyran;
$\Delta^4$-3-keto-11α-hydroxy-2'-methyl-6'β-methoxy-5',6'-dihydroandrostano-[17,16α-c]-pyran;
$\Delta^4$-3-keto-11β-hydroxy-2'-acetoxymethyl-6'β-methoxy-5',6'-dihydroandrostano-[17,16α-c]-pyran;
$\Delta^4$-3,11-diketo-2'-acetoxymethyl-6'β-methoxy-5',6'-dihydroandrostano-[17,16α-c]-pyran;
$\Delta^4$-3-keto-2'-acetoxymethyl-6'β-methoxy-5',6'-dihydroandrostano-[17,16α-c]-pyran;
$\Delta^4$-3,11-diketo-6α-methyl-2'-acetoxymethyl-6'β-methoxy-5',6'-dihydroandrostano-[17,16α-c]-pyran;
$\Delta^4$-3-keto-11β-hydroxy-6α-methyl-2'-acetoxymethyl-6'β-methoxy-5',6'-dihydroandrostano-[17,16α-c]-pyran;
$\Delta^{4,9(11)}$-3-keto-6α-methyl-2'-acetoxymethyl-6'β-methoxy-5',6'-dihydroandrostano-[17,16α-c]-pyran;
$\Delta^{1,4}$-3-keto-6α,2'-dimethyl-6'β-methoxy-5',6'-dihydroandrostano-[17,16α-c]-pyran;
$\Delta^{1,4}$-3-keto-11β-hydroxy-2'-methyl-6'β-methoxy-5',6'-dihydroandrostano-[17,16α-c]-pyran;
$\Delta^{1,4}$-3,11-diketo-6α-methyl-2'-acetoxymethyl-6'β-methoxy-5',6'-dihydroandrostano-[17,16α-c]-pyran;
$\Delta^{1,4}$-3-keto-11β-hydroxy-6α-methyl-2'-acetoxymethyl-6'β-methoxy-5',6'-dihydroandrostano-[17,16α-c]-pyran;

$\Delta^{1,4,9(11)}$-3-keto-6α-methyl-2'-acetoxymethyl-6'β-methoxy-5',6'-dihydroandrostano-[17,16α-c]-pyran;

$\Delta^{1,4}$-3,11-diketo-2'-methyl-6'β-methoxy-5',6'-dihydroandrostano-[17,16α-c]-pyran;

$\Delta^{1,4}$-3-keto-11α-hydroxy-2'-methyl-6'β-methoxy-5',6'-dihydroandrostano-[17,16α-c]-pyran;

$\Delta^{1,4}$-3-keto-11β-hydroxy-2'-acetoxymethyl-6'β-methoxy-5',6'-dihydroandrostano-[17,16α-c]-pyran;

$\Delta^{1,4}$-3,11-diketo-2'-acetoxymethyl-6'β-methoxy-5',6'-dihydroandrostano-[17,16α-c]-pyran;

$\Delta^{1,4}$-3-keto-2'-acetoxymethyl-6'β-methoxy-5',6'-dihydroandrostano-[17,16α-c]-pyran;

$\Delta^{5}$-3β-acetoxy-2',6-dimethyl-6'β-methoxy-5',6'-dihydroandrostano-[17,16α-c]-pyran;

3β-acetoxy-11-keto-2'-acetoxymethyl-6'β-methoxy-5',6'-dihydro-5α-androstano-[17,16α-c]-pyran;

3β-acetoxy-11β-hydroxy-2'-acetoxymethyl-6'β-methoxy-5',6'-dihydro-5α-androstano-[17,16α-c]-pyran;

3β-acetoxy-2'-methyl-6'β-methoxy-5',6'-dihydroandrostano-[17,16α-c]-pyran;

3α-acetoxy-11-keto-2'-methyl-6'β-methoxy-5',6'-dihydroandrostano-[17,16α-c]-pyran;

3α-acetoxy-11β-hydroxy-2'-methyl-6'β-methoxy-5',6'-dihydroandrostano-[17,16α-c]-pyran;

3β-acetoxy-2'-methyl-6'β-methoxy-5',6'-dihydro-5α-androstano-[17,16α-c]-pyran;

3α-acetoxy-2'-methyl-6'β-methoxy-5',6'-dihydroandrostano-[17,16α-c]-pyran;

$\Delta^{4}$-9α-fluoro-3-keto-11β-hydroxy-2'-acetoxymethyl-6'β-methoxy-5',6'-dihydroandrostano-[17,16α-c]-pyran;

$\Delta^{4}$-9α-fluoro-3,11-diketo-2'-acetoxymethyl-6'β-methoxy-5',6'-dihydroandrostano-[17,16α-c]-pyran;

$\Delta^{1,4}$-9α-fluoro-3,11-diketo-2'-acetoxymethyl-6'β-methoxy-5',6'-dihydroandrostano-[17,16α-c]-pyran;

$\Delta^{1,4}$-9α-fluoro-3-keto-11β-hydroxy-2'-acetoxymethyl-6'β-methoxy-5',6'-dihydroandrostano-[17,16α-c]-pyran;

$\Delta^{4}$-9α-fluoro-3,11-diketo-2'-methyl-6'β-methoxy-5',6'-dihydroandrostano-[17,16α-c]-pyran; and $\Delta^{1,4}$-9α-fluoro-3,11-diketo-2'-methyl-6'β-methoxy-5',6'-dihydroandrostano-[17,16α-c]-pyran.

The following preparations and examples illustrate the best mode contemplated by the inventor for carrying out his invention, but are not to be construed as limiting the scope thereof.

PREPARATION 1

6α,9α-difluoro-11β-hydroxy-$\Delta^{1,4}$-3-keto - 6'β - methoxy-2'-acetoxymethyl-5',6'-dihydroandrostano-[17,16α-c]-pyran

A. 6α-FLUORO-21-ACETOXY-1,4,9(11),16-PREGNATETRAENE-3,20-DIONE

A solution of 10g. of 6α-fluoro-17α,21-dihydroxy-1,4,9(11)-pregnatriene-3,20-dione 21-acetate (U.S. 2,838,499) in 28 ml. of pyridine was stirred at room temperature while a solution of 5.6 g. of N-bromoacetamide in 23 ml. of pyridine was added all at once. The resulting mixture was stirred in the dark for a short period before being cooled to 10° C. and added slowly to 25 ml. of a cooled, saturated, solution of sulfur dioxide in pyridine. After the addition was complete, the resulting mixture was stirred for a short period at room temperature (25° C.) before being poured slowly with stirring into 500 ml. of ice-water. The solid which separated was isolated by filtration, washed with water, and dried. The material so obtained was dissolved in a small quantity of methylene chloride and chromatographed on a column of alumina. The column was eluted with benzene containing increasing proportions of acetone and those fractions which, on the basis of infrared analysis were found to contain the desired material, were combined and evaporated to dryness. The residue was recrystallized from a mixture of acetone and Skellysolve B. There was thus obtained 2.40 g. of 6α-fluoro-21-acetoxy-1,4,9(11),16-pregnatetraene-3,20-dione in the form of a crystalline solid having a melting point of 173 to 188° C. An analytical sample having a melting point of 188 to 190° C. was obtained by further recrystallization from a mixture of acetone and Skellysolve B; $[\alpha]_D + 112°$ (chloroform).

Analysis.—Calcd. for $C_{23}H_{25}O_4F$: C, 71.85; H, 6.56; F, 4.94. Found: C, 72.05; H, 6.46; F, 4.62.

[The infrared spectrum of the above material (mineral oil mull) exhibited maxima at 1746, 1678, 1637, 1611, 1582, 1240, and 1223 reciprocal centimeters. The ultraviolet spectrum of the compound (ethanol solution) exhibited maxima at 238 millimicrons ($\epsilon = 24,300$).

B. 6α-FLUORO-9β,11β-OXIDO-21-HYDROXY-1,4,16-PREGNATRIENE-3,20-DIONE 21-ACETATE

To a stirred solution of 8.12 g. of 6α-fluoro-21-acetoxy-1,4,9(11),16-pregnatetraene-3,20-dione in 169 ml. of methylene chloride and 338 ml. of t-butyl alcohol is added a solution of 44.6 g. of N-bromoacetamide in 81 ml. of t-butyl alcohol followed by a solution of 23 ml. of 70% perchloric acid in 122 ml. of water. The resulting mixture is stirred for approximately 20 minutes and then a solution of 4.5 g. of sodium sulfite in 81 ml. of water is added with stirring. The mixture so obtained is concentrated under reduced pressure to a volume of approximately 250 ml. The concentrate is cooled and diluted with an equal volume of water. The solid which separates is isolated by filtration, washed with water, and dried in vacuo. The dried material is heated with stirring under reflux for 24 hr. with a mixture of 247 ml. of acetone and 8.45 g. of anhydrous potassium acetate. The reaction mixture is cooled and diluted, with stirring, with methylene chloride. The insoluble material is isolated by filtration and washed with methylene chloride. The methylene chloride washings and filtrate are combined and evaporated to dryness. The residue is recrystallized from a mixture of acetone and Skellysolve B (commercial hexanes). There is thus obtained 6α-fluoro-9β,11β-oxido-21-hydroxy-1,4,16-pregnatriene-3,20-dione 21 - acetate in the form of a crystalline solid.

C. 6α,9α-DIFLUORO-11β,21-DIHYDROXY-1,4,16-PREGNATRIENE-3,20-DIONE 21-ACETATE

A solution of 5.05 g. of 6α-fluoro-9β,11β-oxido-21-hydroxy-1,4,16-pregnatriene-3,20-dione 21-acetate in 16 ml. of methylene chloride is cooled in a Dry Ice-acetone bath and added to a solution (maintained in a Dry Ice-acetone bath) of 6.15 g. of anhydrous hydrogen fluoride in 11 ml. of tetrahydrofuran. The resulting mixture is maintained at approximately 4° C. for several hours and then allowed to stand at room temperature (approximately 25° C.) for a short period. The mixture so obtained is added cautiously, with stirring, to a mixture of 25.3 g. of potassium carbonate, ice, and 500 ml. of water. The aqueous mixture so produced is then extracted three times with methylene chloride and the methylene chloride extracts are combined, washed with water, and dried over anhydrous sodium sulfate. The dried methylene chloride solution is evaporated to dryness and the residue is recrystallized from a mixture of acetone and Skellysolve B. There is thus obtained 6α,9α-difluoro-11β,21-dihydroxy-1,4,16-pregnatriene-3,20-dione 21-acetate in the form of a crystalline solid.

D. 6α,9α-DIFLUORO - 11β - HYDROXY - $\Delta^{1,4}$ - 3 - KETO-6'β-METHOXY-2'-ACETOXYMETHYL - 5',6' - DIHYDROANDROSTANO-[17,16α-c]-PYRAN An autoclave is charged with 80 ml. of methyl vinyl ether, 5.0 g. of 6α,9α-difluoro-11β,21-dihydroxy-1,4,16-pregnatriene-3,20-dione 21-acetate, and 0.1 g. of hydroquinone, and nitrogen is introduced at an initial pressure of approximately 10 p.s.i. The autoclave is sealed and heated with agitation at 200° C. for 24 hr. The reaction product so obtained is removed from the autoclave and evaporated to dryness. The residue is dissolved in a small quantity of methylene chloride and chromatographed on a column of 250 g. of magnesium silicate (Florisil). The column is eluated with Skellysolve B containing increasing proportions of acetone and those fractions which, on the basis of infrared analysis, are found to contain the desired material are combined and evaporated to dryness. The residue is recrystallized from aqueous methanol. There is thus obtained 6α,9α-difluoro-11β-hydroxy-Δ$^{1,4}$-3-keto-6′β-methoxy - 2′ - acetoxymethyl-5′,6′-dihydroandrostano-[17,16α-c]-pyran in the form of a crystalline solid.

Similarly, using the procedure set forth in Part D above but replacing 6α,9α-difluoro-11β,21-dihydroxy-1,4,16-pregnatriene-3,20-dione 21-acetate by 6α-fluoro-21-acetoxy-4,9(11),16 - pregnatriene - 3,20 - dione [prepared from 6α-fluoro-17α,21-dihydroxy-4,9(11)-pregnadiene-3,20-dione 21-acetate (U.S. 2,838,545) by the procedure described in Part A above], 6α-fluoro-4,16-pregnadiene-3,11,20-trione [prepared from 6α-fluoro-17α-hydroxy-4-pregnene-3,11,20-trione (U.S. 2,838,541) by the procedure described in Part A above], 6α-fluoro-1,4,16-pregnatriene-3,20-dione [prepared from 6α-fluoro-17α-hydroxy-1,4-pregnadiene-3,20-dione (U.S. 2,838,531) by the procedure described in Part A above], and 6α-fluoro-21-acetoxy-1,4,9(11),16-pregnatetraene-3,20-dione, there are obtained 6α-fluoro-3-keto-Δ$^{4,9(11)}$-2′-acetoxymethyl-, 6α-fluoro-3,11-diketo-Δ$^4$-2′-methyl-, 6α-fluoro - 3 - keto-Δ$^{1,4}$-2′-methyl-, and 6α-fluoro-3-keto-Δ$^{1,4,9(11)}$-2′-acetoxymethyl-6′β-methoxy - 5′6′ - dihydroandrostano - [17,16α-c]-pyran, respectively.

EXAMPLE 1

*16α-ethyl-3β-hydroxy-16b,21-cyclopregna-5,16b(21)-diene-20-one*

A solution of 1.1 g. of Δ$^5$-3β-hydroxy-2′-methyl-6′β-methoxy-5′,6′-dihydroandrostano-[17,16α-c]-pyran in 50 ml. of tetrahydrofuran was treated with 2.5 ml. of 25 percent aqueous sulfuric acid and the mixture was allowed to stand for 18 hr. at room temperature. The mixture so obtained was extracted with methylene chloride and the methylene chloride extracts were washed with aqueous sodium bicarbonate solution, then with water, and dried over anhydrous sodium sulfate. The dried solution was filtered and the filtrate was evaporated to dryness. The residue was dissolved in methylene chloride and chromatographed on a column of magnesium silicate (Florisil). The column was eluted with Skellysolve B (commercial hexanes) containing increasing proportions of acetone and those fractions which, on the basis of infrared and paper chromatographic analysis were found to contain the desired materials, were combined and evaporated to dryness and crystallized from acetone-Skellysolve B mixture. The following materials were so obtained:

(A) 90 mg. of 16α-ethyl-3β-hydroxy-16b,21-cyclopregna-5,16b(21)-diene-20-one (also called 2,3,4,4a,4b,5,6,-6a,6b,7,10,10a,11,11a,11b,12 - hexadecahydro - 4a,6a - dimethyl-7-oxo-1H-indeno(2,1-a)-phenanthrene-2-ol) in the form of a crystalline solid having a melting point of 226 to 235° C. An analytical sample having a melting point of 238 to 242° C. was obtained by further recrystallization from methanol.

*Analysis.*—Calcd. for $C_{23}H_{32}O_2$: C, 81.13; H, 9.47. Found: C, 80.63; H, 9.71.

The infrared spectrum of the compound (mineral oil mull) exhibited maxima at 3570, 3400, 3260, 3040, 3020, 1655, 1645, 1613, 1097, 1077, 1067, 1057, 1038, 1020, and 1000 reciprocal centimeters. The ultraviolet spectrum of the compound (ethanol solution) exhibited a maximum at 232 millimicrons (Σ=8,450).

(B) 0.25. g. of 16α-(2-oxoethyl)-5-pregnene-3β-ol-20-one in the form of a crystalline solid having a melting point of 192 to 198° C.

In like manner using the procedure of Example 1, but replacing Δ$^5$-3β - hydroxy-2′ - methyl - 6′β-methoxy-5′6′-dihydroandrostano-[17,16α-c]-pyran by:

Δ$^5$-3β-actetoxy-2′-methyl-,
Δ$^4$-3-keto-2′-methyl-,
Δ$^4$-3-keto-2′,6α-dimethyl-,
Δ$^{1,4,9(11)}$-3-keto-2′-,6α-dimethyl-,
Δ$^5$-3β-acetoxy-2′-acetoxymethyl-,
Δ$^4$-3,11-diketo-2′-methyl-,
Δ$^4$-3-keto-11α-hydroxy-2′-methyl-,
Δ$^4$-3-keto-11β-hydroxy-2′methyl,
Δ$^4$3-keto-11β-hydroxy-2′-acetoxymethyl-,
Δ$^4$3,11-diketo-2′-acetoxymethyl-,
Δ$^4$-3-keto-2′-acetoxymethyl-,
Δ$^4$-3,11-diketo-6α-methyl-2′-acetoxymethyl-,
Δ$^4$-3-keto-11β-hydroxy-6α-methyl-2′-acetoxymethyl-,
Δ$^{4,9(11)}$-3-keto-6α-methyl-2′-acetoxymethyl-,
Δ$^{1,4}$-3-keto-6α,9α-difluoro-11β-hydroxy-2′-acetoxymethyl-,
Δ$^{4,9(11)}$-3-keto-6α-fluoro-2′-acetoxymethyl-,
Δ$^4$-3,11-diketo-6α-fluoro-2′-methyl-,
Δ$^{1,4}$-3-keto-6α-fluoro-2′methyl-,
Δ$^{1,4,9(11)}$-3-keto-6α-fluoro-2′acetoxymethyl-,
Δ$^{1,4}$-3-keto-6α,2′-dimethyl-,
Δ$^{1,4}$-3-keto-11β-hydroxy-2′-methyl-,
Δ$^{1,4}$-3,11-diketo-6α-methyl-2′-acetoxymethyl-,
Δ$^{1,4}$-3-keto-11β-hydorxy-6α-methyl-2′-acetoxymethyl-,
Δ$^{1,4,9(11)}$-3-keto-6α-methyl-2′-acetoxymethyl-,
Δ$^{1,4}$-3,11-diketo-2′-methyl-,
Δ$^{1,4}$-3-keto-11α-hydroxy-2′-methyl-,
Δ$^{1,4}$-3-keto-11β-hydroxy-2′-acetoxymethyl-,
Δ$^{1,4}$-3,11-diketo-2′-acetoxymethyl-,
Δ$^{1,4}$-3-keto-2′-acetoxymethyl-,
Δ$^5$-3β-acetoxy-2′,6-dimethyl-,
3β-acetoxy-2′-methyl-,
3α-acetoxy-11-keto-2′-methyl-,
3α-acetoxy-11β-hydroxy-2′-methyl-,
3α-acetoxy-2′-methyl-,
Δ$^4$-9α-fluoro-3-keto-11β-hydroxy-2′-acetoxymethyl-,
Δ$^4$-9α-fluoro-3,11-diketo-2′-acetoxymethyl-,
Δ$^{1,4}$-9α-fluoro-3,11-diketo-2′-acetoxymethyl-,
Δ$^{1,4}$-9α-fluoro-3-keto-11β-hydroxy-2′-acetoxymethyl-,
Δ$^4$-9α-fluoro-3,11-diketo-2′-methyl-,
Δ$^{1,4}$-9α1fluoro-3,11-diketo-2′-methyl-6′β-methoxy-5′,6′-dihydro-androstano[17,16α-c]-pyran, or
3β-acetoxy-11-keto-2′-acetoxymethyl-6′β-methoxy-5′,6′-dihydro-5α-androstano-[17,16α-c]-pyran,
there are obtained
16α-ethyl-3β-hydroxy-16b,21-cyclopregna-5,16b(21)-diene-20-one 3β-acetate,
16α-ethyl-16b,21-cyclopregna-4,16b(21)-diene-3,20-dione,
16α-ethyl-6α-methyl-16b,21-cyclopregna-4,16b(21)-diene-3,20-dione,
16α-ethyl-6α-methyl-16b,21-cyclopregna-1,4,9(11),16b(21)-tetraene-3,20-dione,
16α-ethyl-6αmethyl-16b,21-cyclopregna-1,4,9(11),16b(21)-tetraene-3,20-dione,
16α-ethyl-3β,21-dihydroxy-16b,21-cyclopregna-5,16b(21)-diene-20-one 3β,21-diacetate,
16α-ethyl-16b,21-cyclopregna-4,16b(21)-diene-3,11,20-trione,
16α-ethyl-11α-hydroxy-16b,21-cyclopregna-4,16b(21)-diene-3,20-dione,
16α-ethyl-11β-hydroxy-16b,21-cyclopregna-4,16b(21)-diene-3,20-dione,
16β-ethyl-11β,21-dihydroxy-16b,21-cyclopregna-4,16b(21)-diene-3,20-dione 21-acetate,
16α-ethyl-21-hydroxy-16b,21-cyclopregna-4,16b(21)-diene-3,11,20-trione 21-acetate,
16α-ethyl-21-hydroxy-16b,21-cyclopregna-4,16b(21)-diene-3,20-dione 21-acetate,
16α-ethyl-6α-methyl-21-hydroxy-16b,21-cyclopregna-4,16b,(21)-diene-3,11,20-trione 21-acetate,
16α-ethyl-6α-methyl-11β,21-dihydroxy-16b,21-cyclopregna-4,16b(21)-diene-3,20-dione 21-acetate,
16α-ethyl-6α-methyl-21-hydroxy-16b,21-cyclopregna-4,9(11),16b(21)-triene-3,20-dione 21-acetate,
16α-ethyl-6α,9α-difluoro-11β,21-dihydroxy-16b,21-cyclopregna-1,4,16b(21)-triene-3,20-dione 21-acetate, 16α-ethyl-6α-fluoro-21-hydroxy-16b,21-cyclopregna-4,
  9(11),16b(21)-triene-3,20-dione 21-acetate,
16α-ethyl-6α-fluoro-16b,21-cyclopregna-4,16b(21)-
  diene-3,11,20-trione.
16α-ethyl-6α-fluoro-16b,21-cyclopregna-1,4,
  16b(21)-triene-3,20-dione,
16α-ethyl-6α-fluoro-21-hydroxy-16b,21-cyclopregna-1,
  4,9(11),16b(21)-tetraene-3,20-dione 21-acetate,
16α-ethyl-6α-methyl-16b,21-cyclopregna-1,4,16b(21)-
  triene-3,20-dione,
16α-ethyl-11β-hydroxy-16b,21-cyclopregna-1,4,
  16b(21)-triene-3,20-dione,
16α-ethyl-6α-methyl-21-hydroxy-16b,21-cyclopregna-1,
  4,16b(21)-triene-3,11,20-trione 21-acetate,
16α-ethyl-6α-methyl-11β,21-dihydroxy-16b,21-cyclo-
  pregna-1,4,16b(21)-triene-3,20-dione 21-acetate,
16α-ethyl-6α-methyl-21-hydroxy-16b,21-cyclopregna-1,
  4,9(11),16b(21)-tetraene-3,20-dione 21-acetate,
16α-ethyl-16b,21-cyclopregna-1,4,16b(21)-triene-3,11,
  20-trione,
16α-ethyl-11α-hydroxy-16b,21-cyclopregna-1,4,
  16b(21)-triene-3,20-dione,
16α-ethyl-11β,21-dihydroxy-16b,21-cyclopregna-1,4,
  16b(21)-triene-3,20-dione 21-acetate,
16α-ethyl-21-hydroxy-16b,21-cyclopregna-1,4,
  16b(21)-triene-3,11,20-trione 21-acetate,
16α-ethyl-21-hydroxy-16b,21-cyclopregna-1,4,
  16b(21)-triene-3,20-dione 21-acetate,
16α-ethyl-6α-methyl-3β-hydroxy-16b,21-cyclopregna-5,
  16b(21)-diene-20-one 3β-acetate,
16α-ethyl-3β-hydroxy-16b,21-cyclopregn-16b(21)-ene-
  20-one 3β-acetate,
16α-ethyl-3α-hydroxy-16b,21-cyclopregn-16b
  (21)-ene-11-20-dione 3α-acetate,
16α-ethyl-3α,11β-dihydroxy-16b,21-cyclopregn-16b
  (21)-ene-20-one 3α-acetate,
16α-ethyl-3α-hydroxy-16b,21-cyclopregn-16b(21)-ene-
  20-one 3α-acetate,
16α-ethyl-9α-fluoro-11β,21-dihydroxy-16b,
  21-cyclopregna-4,16b(21)-diene-3,20-dione 21-acetate,
16α-ethyl-9α-fluoro-21-hydroxy-16b,21-cyclopregna-4,
  16b(21)-diene-3,11,20-trione 21-acetate
16α-ethyl-9α-fluoro-21-hydroxy-16b,21-cyclopregna-1,
  4,16b(21)-triene-3,11,20-trione 21-acetate,
16α-ethyl-9α-fluoro-11β,21-dihydroxy-16b,21-cyclopregna-
  1,4,16b(21)-triene-3,20-dione 21-acetate,
16α-ethyl-9α-fluoro-16b,21-cyclopregna-4,
  16b(21)-diene-3,11,20-trione,
16α-ethyl-9α-fluoro-16b,21-cyclopregna-1,4,
  16b(21)-triene-3,11,20-trione, and
16α-ethyl-3β,21-dihydroxy-16b,21-cyclo-5α-pregn-16b
  (21)-ene-11,20-dione 3β,21-diacetate, respectively.

EXAMPLE 2

*16α-ethyl-3β-hydroxy-16b,12-cyclopregna-5,
16b(21)-diene-20-one 3β-acetate*

A mixture of 1.1 g. of 16α-ethyl-3β-hydroxy-16b,21-cyclopregna-5,16b(21)-diene-20-one, 5 ml. of acetic anhydride and 15 ml. of pyridine was allowed to stand for 18 hr. at room temperature. The resulting mixture was poured into ice water and the solid which separated was isolated by filtration, washed with water and dried in vacuo. The dried material was recrystallized from aqueous ethanol. There was thus obtained 1.03 g. of 16α-ethyl-3β-hydroxy-16b,21-cyclopregna-5,16b(21)-diene-20-one 3β-acetate in the form of a crystalline solid having a melting point of 235 to 236° C.

*Analysis.*—Calcd. for $C_{25}H_{34}O_3$: C, 78.49; H, 8.96. Found: C, 78.24; H, 8.87.

The infrared spectrum of the compound (mineral oil mull) exhibited maxima at 1737, 1660, 1248 and 1034 reciprocal centimeters. The ultraviolet spectrum of the compound (ethanol solution) exhibited a maximum at 230 millimicrons.

EXAMPLE 3

*3β,3'-dihydroxy-Δ⁵-androsteno-[16,17-1',2']-
benzene 3β-acetate*

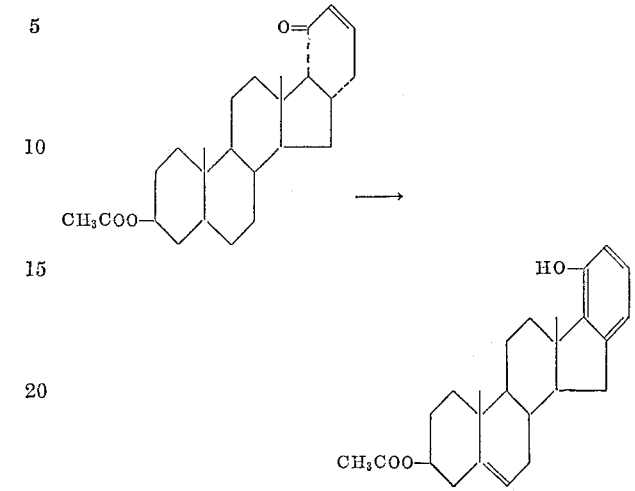

A mixture of 1.86 g. of 16α-ethyl-3β-hydroxy-16b,21-cyclopregna-5,16b(21)-diene-20-one 3β-acetate, 100 ml. of p-cymene (previously purified by passage through neutral alumina) and 0.75 g. of 5 percent palladium-on-charcoal was heated under reflux in a nitrogen atmosphere until infrared analysis of a sample of the reaction showed no absorption corresponding to an αβ-unsaturated ketone. At the end of this time the reaction mixture was cooled and filtered and the filtrate was evaporated to dryness under reduced pressure. The residue was dissolved in methylene chloride and chromatographed on a column of magnesium silicate (Florisil). The column was eluted with Skellysolve B containing increasing portions of acetone and those fractions of eluate which, on the basis of infrared absorption analysis, were found to contain the desired material were combined and evaporated to dryness. There was thus obtained 1.135 g. of 3β,3'-dihydroxy-Δ⁵-androsteno-[16,17-1',2']-benzene 3β-acetate in the form of a crystalline solid which, after recrystallization from methanol, had a melting point of 210 to 213° C.

*Analysis.*—Calcd. for $C_{25}H_{32}O_3$: C, 78.91; H, 8.48. Found: C, 78.51; H, 9.19.

The infrared spectrum of the compound (mineral oil mull) exhibited maxima at 3350, 1705 and 1608 reciprocal centimeters. The ultraviolet spectrum of the compound (ethanol solution) exhibited maxima at 218, 262 (sh.), 271, 278, 291, and 301.5 millimicrons.

Using the procedure described in Example 3, but replacing 16α - ethyl - 3β - hydroxy - 16b,21-cyclopregna-5,16b(21)-diene-20-one-3β-acetate by:

16α-ethyl-16b,21-cyclopregna-4,16b(21)diene-3,20-
  dione,
16α-ethyl-6α-methyl-16b,21-cyclopregna-4,16b(21)-
  diene-3,20-dione,
16α-ethyl-6α-methyl-16b,21-cyclopregna-1,4,9(11),
  16b(21)-tetraene-3,20-dione,
16α-ethyl-3β,21-dihydroxy-16b,21-cyclopregna-5,16b
  (21)-diene-20-one 3β, 21-diacetate,
16α-ethyl-16b,21-cyclopregna-4,16b(21)-diene-3,11,20-
  trione,
16α-ethyl-11α-hydroxy-16b,21-cyclopregna-4,16b(21)-
  diene-3,20-dione,
16α-ethyl-11β-hydroxy-16b,21-cyclopregna-4,16b(21)-
  diene-3,20-dione,
16α-ethyl-11β,21-dihydroxy-16b,21-cyclopregna-4,16b
  (21)-diene-3,20-dione 21-acetate,
16α-ethyl-21-hydroxy-16β,21-cyclopregna-4,16b(21)-
  diene-3,11,20-trione 21-acetate,
16α-ethyl-21-hydroxy-16b,21-cyclopregna-4,16b(21)-
  diene-3,20-dione 21-acetate, 16α-ethyl-6α-methyl-21-hydroxy-16b,21-cyclopregna-
4,16b(21)-diene-3,11,20-trione 21-acetate,
16α-ethyl-6α-methyl-11β,21-dihydroxy-16b,21-cyclo-
pregna-4,16b(21)-diene-3,20-dione 21-acetate,
16α-ethyl-6α-methyl-21-hydroxy-16b,21-cyclopregna-
4,9(11),16b(21)-triene-3,20-dione 21-acetate,
16α-ethyl-6α,9α-difluoro-11β,21-dihydroxy-16b,21-
cyclopregna-1,4,16b(21)-triene-3,20-dione 21-acetate,
16α-ethyl-6α-fluoro-21-hydroxy-16b,21-cyclopregna-
4,9,(11),16b(21)-triene-3,20-dione 21-acetate,
16α-ethyl-6α-fluoro-16b,21-cyclopregna-4,16b(21)-
diene-3,11,20-trione,
16α-ethyl-6α-fluoro-16b,21-cyclopregna-1,4,16b(21)-
triene-3,20-dione,
16α-ethyl-6α-fluoro-21-hydroxy-16b,21-cyclopregna-
1,4,9(11),16b(21)-tetraene-3,20-dione 21-acetate,
16α-ethyl-6α-methyl-16b,21-cyclopregna-1,4,16b(21)-
triene-3,20-dione,
16α-ethyl-11β-hydroxy-16b,21-cyclopregna-1,4,16b
(21)-triene-3,20-dione,
16α-ethyl-6α-methyl-21-hydroxy-16b,21-cyclopregna-
1,4,16b(21)-triene-3,11,20-trione 21- acetate,
16α-ethyl-6α-methyl-11β,21-dihydroxy-16b,21-cyclo-
pregna-1,4,16b(21)-triene-3,20-dione 21-acetate,
16α-ethyl-6α-methyl-21-hydroxy-16β,21-cyclopregna-
1,4,9(11),16b(21)-tetraene-3,20-dione 21-acetate,
16α-ethyl-16b,21-cyclopregna-1,4,16b(21)-triene-3,11,
20-trione,
16α-ethyl-11α-hydroxy-16b,21-cyclopregna-1,4,16b
(21)-triene-3,20-dione,
16α-ethyl-11β,21-dihydroxy-16b,21-cyclopregna-1,4,
16b(21)-triene-3,20-dione 21-acetate,
16α-ethyl-21-hydroxy-16b,21-cyclopregna-1,4,16b(21)-
triene-3,11,20-trione 21-acetate,
16α-ethyl-21-hydroxy-16b,21-cyclopregna-1,4,16b(21)-
triene-3,20-dione 21-acetate,
16α-ethyl-6α-methyl-3β-hydroxy-16b,21-cyclopregna-
5,16b(21)-diene-20-one 3β-acetate,
16α-ethyl-3β-hydroxy-16b,21-cyclopregn-16b(21)-ene-
20-one 3β-acetate,
16α-ethyl-3α-hydroxy-16b,21-cyclopregn-16b(21)-ene-
11,20-dione 3α-acetate,
16α-ethyl-3α,11β-dihydroxy-16b,21-cyclopregn-16b
(21)-ene-20-one 3α-acetate,
16α-ethyl-3α-hydroxy-16β,21-cyclopregn-16b(21)-ene-
20-one 3α-acetate,
16α-ethyl-9α-fluoro-11β,21-dihydroxy-16b,21-cyclo-
pregna-4,16b(21)-diene-3,20-dione 21-acetate,
16α-ethyl-9α-fluoro-21-hydroxy-16b,21-cyclopregna-
4,16b(21)-diene-3,11,20-trione 21-acetate,
16α-ethyl-9α-fluoro-21-hydroxy-16b,21-cyclopregna-
1,4,16b(21)-triene-3,11,20-trione 21-acetate,
16α-ethyl-9α-fluoro-11β,21-dihydroxy-16b,21-cyclo-
pregna-1,4,16b(21)-triene-3,20-dione 21-acetate,
16α-ethyl-9α-fluoro-16b,21-cyclopregna-4,16b(21)-
diene-3,11,20-trione,
16α-ethyl-9α-fluoro-16b,21-cyclopregna-1,4,16b(21)-
triene-3,11,20-trione, or
16α-ethyl-3β,21-dihydroxy-16b,21-cyclo-5α-pregn-
16b(21)-ene-11,20-dione 3β,21-diacetate, there are obtained:

3'-hydroxy-3-keto-$\Delta^4$-,
6α-methyl-3'-hydroxy-3-keto-$\Delta^4$-,
6α-methyl-3'-hydroxy-3-keto-$\Delta^{1,4,9(11)}$-,
3'-hydroxy-3β,4'-diacetoxy-$\Delta^5$-,
3'-hydroxy-3,11-diketo-$\Delta^4$-,
3',11α-dihydroxy-3-keto-$\Delta^4$-,
3',11β-dihydroxy-3-keto-$\Delta^4$-,
4'-acetoxy-3'11β-dihydroxy-3-keto-$\Delta^4$-,
4'-acetoxy-3'-hydroxy-3,11-diketo-$\Delta^4$-,
4'-acetoxy-3'-hydroxy-3-keto-$\Delta^4$-,
4'-acetoxy-3'-hydroxy-6α-methyl-3,11-diketo-$\Delta^4$-,
4'-acetoxy-3'-hydroxy-6α-methyl-3-keto-$\Delta^{4,9(11)}$-,
4'-acetoxy-3',11β-dihydroxy-6α,9α-difluoro-3-keto-$\Delta^{1,4}$-,
4'-acetoxy-3'-hydroxy-6α-fluoro-3-keto-$\Delta^{4,9(11)}$-,
3'-hydroxy-6α-fluoro-3,11-diketo-$\Delta^4$-,
3'-hydroxy-6α-fluoro-3-keto-$\Delta^{1,4}$-,
4'-acetoxy-3'-hydroxy-6α-fluoro-3-keto-$\Delta^{1,4,9(11)}$-,
3'-hydroxy-6α-methyl-3-keto-$\Delta^{1,4}$-,
3',11β-dihydroxy-3-keto-$\Delta^{1,4}$-,
4'-acetoxy-3'-hydroxy-6α-methyl-3,11-diketo-$\Delta^{1,4}$-,
4'-acetoxy-3',11β-dihydroxy-6α-methyl-3-keto-$\Delta^{1,4}$-,
4'-acetoxy-3'-hydroxy-6α-methyl-3-keto-$\Delta^{1,4,9(11)}$-,
3'-hydroxy-3,11-diketo-$\Delta^{1,4}$-,
3',11α-dihydroxy-3-keto-$\Delta^{1,4}$-,
4'-acetoxy-3',11β-dihydroxy-3-keto-$\Delta^{1,4}$-,
4'-acetoxy-3'-hydroxy-3',11-diketo-$\Delta^{1,4}$-,
4'-acetoxy-3'-hydroxy-3-keto-$\Delta^{1,4}$-, and
3β-acetoxy-3'-hydroxy-6α-methyl-$\Delta^5$-androsteno-
[16,17-1',2']-benzene,
3β-acetoxy-3'-hydroxy-,
3α-acetoxy-3'-hydroxy-11-keto-,
3α-acetoxy-3',11β-dihydroxy-, and
3α-acetoxy-3'-hydroxy-androstano-[16,17-1',2']-
benzene,
4'-acetoxy-3',11β-dihydroxy-9α-fluoro-3-keto-$\Delta^4$-,
4'-acetoxy-9α-fluoro-3'-hydroxy-3,11-diketo-$\Delta^4$-,
4'-acetoxy-9α-fluoro-3'-hydroxy-3,11-diketo-$\Delta^{1,4}$-,
4'-acetoxy-3',11β-dihydroxy-9α-fluoro-3-keto-$\Delta^{1,4}$-,
9α-fluoro-3'-hydroxy-3,11-diketo-$\Delta^4$-,
9α-fluoro-3'-hydroxy-3,11-diketo-$\Delta^{1,4}$-androsteno-
[16,17-1',2']-benzene, and
3β,4'-diacetoxy-3'-hydroxy-11-keto-5α-androstano-
[16,17-1',2']-benzene, respectively.

EXAMPLE 4

*3β,3'-dihydroxy-$\Delta^5$-androsteno-[16,17-1',2']-benzene
3β,3'-diacetate*

To a solution of 1 g. of 3β,3'-dihydroxy-$\Delta^5$-androsteno-[16,17-1',2']-benzene 3β-acetate in 10 ml. of pyridine is added dropwise, with stirring and cooling, an excess of acetylchloride. The mixture so obtained is heated for a short period on the steam bath before being poured into a mixture of ice and dilute hydrochloric acid. The solid which separates is isolated by filtration, washed with water, and recrystallized from aqueous alcohol. There is thus obtained 3β,3'-dihydroxy-$\Delta^5$-androsteno-[16,17-1', 2']-benzene 3β,3'-diacetate in the form of a crystalline solid.

Using the above procedure and employing the appropriate acid chloride there can be obtained the 3'-acylates of the various compounds named at the end of Example 3.

EXAMPLE 5

*3',4',11β-trihydroxy-3-keto-$\Delta^4$-androsteno-
[16,17-1',2']-benzene*

A solution of 1 g. of 4'-acetoxy-3',11β-dihydroxy-3-keto-$\Delta^4$-androsteno-[16,17-1',2']-benzene (prepared as described in Example 3) in 25 ml. of methanol was purged with nitrogen and mixed with a similarly purged solution of 1 g. of potassium bicarbonate in 5 ml. of water. The resulting mixture was stirred under nitrogen for about 4 hrs. and then neutralized by the addition of acetic acid. The methanol was removed by distillation and the residue was cooled. The solid which separated was isolated by filtration, washed with water, and dried. The residue was recrystallized from aqueous ethanol. There was thus obtained 3',4',11β - trihydroxy-3-keto-$\Delta^4$-androsteno-[16, 17-1',2']-benzene in the form of a crystalline solid.

Using the above procedure but replacing 4'-acetoxy-3', 11β - dihydroxy - 3 - keto - $\Delta^4$ - androsteno-[16,17-1',2']-benzene by:

4'-acetoxy-3'-hydroxy-3,11-diketo-$\Delta^4$-,
4'-acetoxy-3',11β-dihydroxy-6α,9α-difluoro-3-keto-$\Delta^{1,4}$-,
4'-acetoxy-3'-hydroxy-3-keto-$\Delta^4$-,
4'-acetoxy-3'-hydroxy-6α-fluoro-3-keto-$\Delta^{4,9(11)}$-,
4'-acetoxy-3'-hydroxy-6α-methyl-3,11-diketo-$\Delta^4$-,
4'-acetoxy-3'-hydroxy-6α-fluoro-3-keto-$\Delta^{1,4,9(11)}$-, 4'-acetoxy-3',11β-dihydroxy-6α-methyl-3-keto-Δ⁴-,
4'-acetoxy-3'-hydroxy-6α-methyl-3-keto-Δ⁴,⁹⁽¹¹⁾-,
4'-acetoxy-3'-hydroxy-6α-methyl-3,11-diketo-Δ¹,⁴-,
4'-acetoxy-3',11β-dihydroxy-6α-methyl-3-keto-Δ¹,⁴-,
4'-acetoxy-3'-hydroxy-6α-methyl-3-keto-Δ¹,⁴,⁹⁽¹¹⁾-,
4'-acetoxy-3',11β-dihydroxy-3-keto-Δ¹,⁴-,
4'-acetoxy-3'-hydroxy-3,11-diketo-Δ¹,⁴-,
4'-acetoxy-3'-hydroxy-3-keto-Δ¹,⁴-,
4'-acetoxy-3',11β-dihydroxy-9α-fluoro-3-keto-Δ⁴-,
4'-acetoxy-9α-fluoro-3'-hydroxy-3,11-diketo-Δ⁴-,
4'-acetoxy-9α-fluoro-3'-hydroxy-3,11-diketo-Δ¹,⁴-, and
4'-acetoxy-3',11β-dihydroxy-9α-fluoro-3-keto-Δ¹,⁴-androsteno-[16,17-1',2']-benzene, and
3β,4'-diacetoxy-3'-hydroxy-11-keto-5α-androstano-[16,17-1',2']-benzene, there are obtained:
3',4'-dihydroxy-3,11-diketo-Δ⁴-,
3',4',11β-trihydroxy-6α,9α-difluoro-3-keto-Δ¹,⁴-,
3',4'-dihydroxy-3-keto-Δ⁴-,
3',4'-dihydroxy-6α-fluoro-3-keto-Δ⁴,⁹⁽¹¹⁾-,
3',4'-dihydroxy-6α-methyl-3,11-diketo-Δ⁴-,
3',4'-dihydroxy-6α-fluoro-3-keto-Δ¹,⁴,⁹⁽¹¹⁾
3',4',11β-trihydroxy-6α-methyl-3-keto-Δ⁴-,
3',4'-dihydroxy-6α-methyl-3-keto-Δ⁴,⁹⁽¹¹⁾-,
3',4'-dihydroxy-6α-methyl-3,11-diketo-Δ¹,⁴-,
3',4',11β-trihydroxy-6α-methyl-3-keto-Δ¹,⁴-,
3',4'-dihydroxy-6α-methyl-3-keto-Δ¹,⁴,⁹⁽¹¹⁾-,
3',4',11β-trihydroxy-3-keto-Δ¹,⁴-,
3',4'-dihydroxy-3,11-diketo-Δ¹,⁴-,
3',4'-dihydroxy-3-keto-Δ¹,⁴-,
3',4',11β-trihydroxy-9α-fluoro-3-keto-Δ⁴-,
3',4'-dihydroxy-9α-fluoro-3,11-diketo-Δ⁴-,
3',4'-dihydroxy-9α-fluoro-3,11-diketo-Δ¹,⁴-, and
3',4',11β-trihydroxy-9α-fluoro-3-keto-Δ¹,⁴-androsteno-[16,17-1',2']-benzene, and
3β,3',4'-trihydroxy-11-keto-5α-androstano-[16,17-1',2']-benzene, respectively.

EXAMPLE 6

*3β - hydroxy - 3' - methoxy-Δ⁵-androsteno-[16,17-1',2']-benzene*

A solution of 0.5 g. of 3β,3'-dihydroxy-Δ⁵-androsteno-[16,17-1',2']-benzene 3β-acetate in a mixture of 25 ml. of methanol and 5 ml. of water containing 3 g. of potassium hydroxide is cooled to 5° C. and four additions of 1.5 ml. each of dimethyl sulfate with vigorous stirring are made at 30 minute intervals. The resulting mixture is then diluted with ice water and extracted with methylene chloride. The methylene chloride extract is washed with water and dried over anhydrous sodium sulfate. The dried solution is evaporated to dryness and the residue is chromatographed on a column of magnesium silicate (Florisil). The column is eluted with Skellysolve B containing increasing proportions of acetone and those fractions which, on the basis of infrared analysis and paper chromatographic analysis, are found to contain the desired material, are combined and evaporated to dryness. The residue is recrystallized from aqueous alcohol. There is thus obtained 3β-hydroxy-3'-methoxy-Δ⁵-androsteno - [16,17-1',2'] - benzene in the form of a crystalline solid.

Similarly, using the above procedure, but replacing the 3β,3' - dihydroxy-Δ⁵-androsteno-[16,17-1',2']-benzene by other 3'-hydroxy compounds of the invention [prepared as described in Example 3] such as 3'-hydroxy-3-keto-Δ⁴-, 6α - methyl-3'-hydroxy-3-keto-Δ⁴-, 3'-hydroxy-3β,4'-diacetoxy - Δ⁵-, 4'-acetoxy-3'-hydroxy-6α-methyl-3-keto-Δ⁴,⁹⁽¹¹⁾-, 4'-acetoxy-9α-fluoro-3'-hydroxy-3,11-diketo-Δ¹,⁴-, and 9α - fluoro-3'-hydroxy - 3,11-diketo-Δ¹,⁴-androsteno-[16,17-1',2']-benzene, there are obtained the corresponding methyl ethers, for example, 3'-methoxy-3-keto-Δ⁴-, 6α-methyl-3'-methoxy - 3 - keto-Δ⁴-, 3',4'-dimethoxy-3β-hydroxy-Δ⁵-, 3',4' - dimethoxy - 6α - methyl - 3 - keto-Δ⁴,⁹⁽¹¹⁾-, 9α - fluoro - 3',4' - dimethoxy - 3,11 - diketo-Δ¹,⁴-, and 9α - fluoro - 3' - methoxy - 3,11 - diketo - Δ¹,⁴-androsteno-[16,17-1',2']-benzene, respectively.

EXAMPLE 7

*3β - hydroxy - 3' - methoxy-Δ⁵-androsteno-[16,17-1',2']-benzene*

A solution of 0.5 g. of 3β,3'-dihydroxy-Δ⁵-androsteno-[16,17-1',2']-benzene 3β-acetate in 25 ml. of methanol is treated with a slight excess of a solution of sodium methoxide in methanol. To the resulting mixture is added 5 ml. of methyl iodide and the solution is heated with stirring for a short period under reflux. The mixture so obtained is concentrated under reduced pressure and the concentrate is diluted with water and extracted with methylene chloride. The methylene chloride extract is washed with water and dried over anhydrous sodium sulfate. The dried solution is evaporated to dryness and the residue is chromatographed on a column of magnesium silicate (Florisil). The column is eluted with a mixture of Skellysolve B and acetone and those fractions which, on the basis of infrared analysis, are found to contain the desired material are combined and evaporated to dryness. The residue is recrystallized from aqueous methanol. There is thus obtained 3β-hydroxy-3'-methoxy-Δ⁵-androsteno-[16,17-1',2']-benzene in the form of a crystalline solid.

Similarly, using the above procedure but replacing methyl iodide by other lower-alkyl halides such as ethyl bromide, isopropyl bromide, amyl iodide, hexyl bromide, octyl chloride and the like, there are obtained the corresponding 3β-hydroxy-3'-lower-alkoxy - Δ⁵ - androsteno-[16,17-1',2']-benzenes.

Similarly, using the procedure set forth in Example 7 and reacting the appropriate alkyl halide with the appropriate 3-hydroxy compound (prepared as described in Example 3) there are obtained the corresponding 3'-alkoxy compounds of the invention. Representative of such compounds are:

3'-isopropoxy-3-keto-Δ⁴-,
6α-methyl-3'-butoxy-3-keto-Δ⁴-,
3',4'-diethoxy-3β-hydroxy-Δ⁵-,
3',4'-dihexyloxy-6α-methyl-3-keto-Δ⁴,⁹⁽¹¹⁾-,
9α-fluoro-3',4'-dioctyloxy-3,11-diketo-Δ¹,⁴-, and
9α - fluoro - 3' - amyloxy - 3,11 - diketo-Δ¹,⁴-androsteno-[16,17-1',2']-benzene.

I claim:
1. A compound selected from the class consisting of compounds having the formulae:

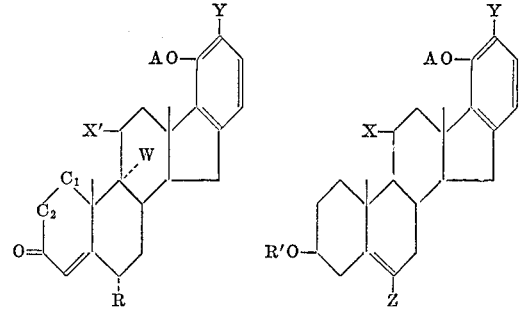

and

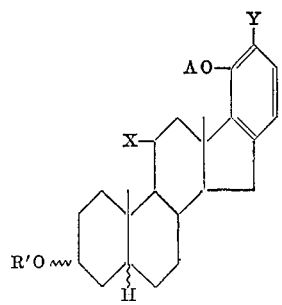

wherein A is selected from the class consisting of hydrogen, lower-alkyl, and the acyl radical of a hydrocarbon carboxylic acid containing from 1 to 12 carbon atoms, inclusive, R is selected from the class consisting of hydrogen, fluorine, and methyl, R' is selected from the class consisting of hydrogen and the acyl radical of a hydrocarbon carboxylic acid containing from 1 to 12 carbon atoms, inclusive, W is selected from the class consisting of hydrogen and fluorine, X' is an 11-substituent selected from the class consisting of hydrogen, keto, and α- and β-hydroxy, and X' and W taken together represent a 9(11)-double bond, X is an 11-substituent selected from the class consisting of hydrogen, keto, α-hydroxy, β-hydroxy, and a 9,11-double bond, Y is selected from the class consisting of hydrogen, hydroxy, lower-alkoxy, and acyloxy wherein acyl is as hereinbefore defined, Z is selected from the class consisting of hydrogen and methyl, and —C$_1$—C$_2$— is a divalent radical selected from the class consisting of —CH$_2$—CH$_2$— and —CH=CH—.

2. 3β,3' - dihydroxy - Δ$^5$ - androsteno-[16,17-1',2']-benzene 3β-acetate.

3. A compound selected from the class consisting of compounds having the formulae:

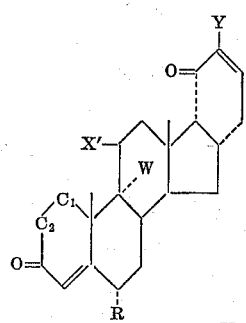

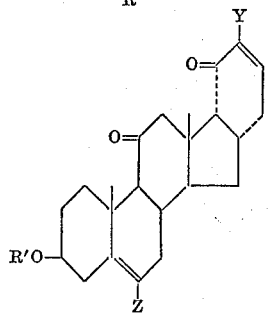

and

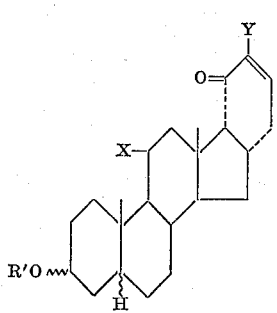

wherein R is selected from the class consisting of hydrogen, fluorine, and methyl, R' is selected from the class consisting of hydrogen and the acyl radical of a hydrocarbon carboxylic acid containing from 1 to 12 carbon atoms, inclusive, W is selected from the class consisting of hydrogen and fluorine, X' is an 11-substituent selected from hydrogen, keto, and α- and β-hydroxy, and X' and W taken together represent a 9(11)-double bond, X is an 11-substituent selected from the class consisting of hydrogen, keto, α-hydroxy, β-hydroxy, and a 9(11)-double bond, Y is selected from the class consisting of hydrogen, hydroxy, and acyloxy wherein acyl is as hereinbefore defined, Z is selected from the class consisting of hydrogen and methyl, and —C$_1$—C$_2$— is a divalent radical selected from the class consisting of —CH$_2$—CH$_2$— and —CH=CH—.

4. 16α-ethyl-3β-hydroxy-16b,21-cyclopregna-5,16b(21)-diene-20-one having the structural formula:

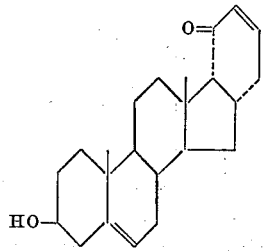

5. 16α - ethyl - 3β - hydroxy - 16b,21 - cyclopregna-5,16b(21)-diene-20-one 3β-acetate having the structural formula:

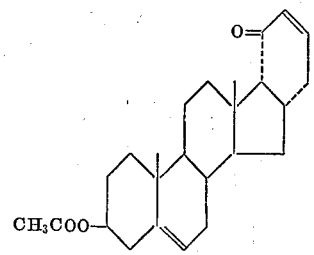

6. A process comprising the steps of subjecting a 2'-substituted - 6'β - alkoxy - 5',6' - dihydroandrostano-[17,16α-c]-pyran having the formula:

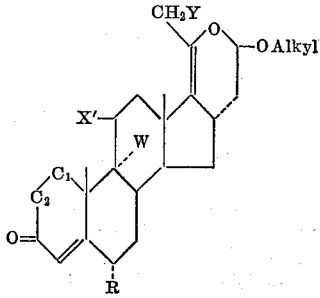

wherein R is selected from the class consisting of hydrogen, fluorine, and methyl, W is selected from the class consisting of hydrogen and fluorine, X' is an 11-substituent selected from the class consisting of hydrogen, keto, and α- and β-hydroxy, and X' and W taken together represent a 9(11)-double bond, Y is selected from the class consisting of hydrogen, hydroxy, and acyloxy wherein the acyl radical is that of a hydrocarbon carboxylic acid containing from 1 to 12 carbon atoms, inclusive, and —C$_1$—C$_2$— is a divalent radical selected from the class consisting of —CH$_2$—CH$_2$— and —CH=CH—, to hydrolysis in the presence of a strong non-oxidizing acid to obtain a compound having the formula:

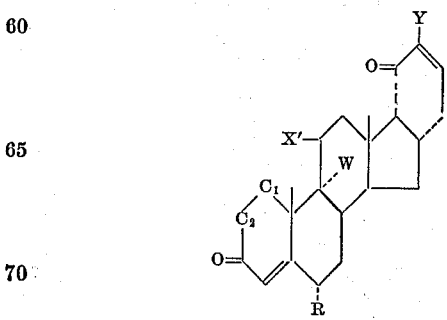

wherein R, W, X', Y and —C$_1$—C$_2$— have the significance above defined, and heating the latter compound with a dehydrogenation catalyst in the presence of a hydrogen acceptor to obtain the corresponding androstano-[16,17-1',2']-benzene having the formula:

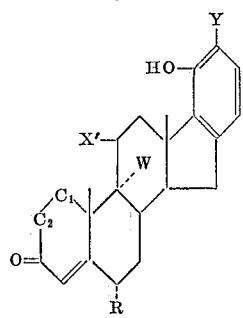

wherein R, W, X', Y and —C₁—C₂— have the significance above defined.

7. A process which comprises subjecting a compound having the formula:

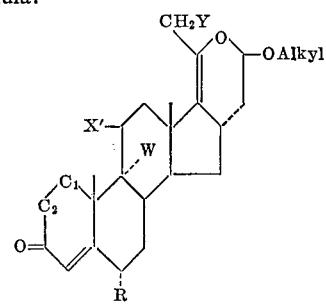

wherein R is selected from the class consisting of hydrogen, fluorine, and methyl, W is selected from the class consisting of hydrogen and fluorine, X' is an 11-substituent selected from the class consisting of hydrogen, keto, and α- and β-hydroxy, and X' and W taken together represent a 9(11)-double bond, Y is selected from the class consisting of hydrogen, hydroxy, and acyloxy wherein the acyl radical is that of a hydrocarbon carboxylic acid containing from 1 to 12 carbon atoms, inclusive, and —C₁—C₂— is a divalent radical selected from the class consisting of —CH₂—CH₂— and —CH=CH—, to hydrolysis in the presence of a strong non-oxidizing acid to obtain a compound having the formula:

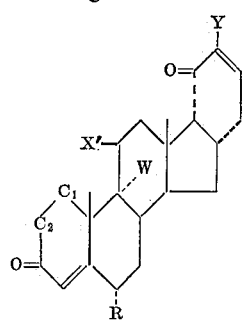

wherein R, W, X', Y and —C₁—C₂— have the significance above defined.

8. A process which comprises heating a compound having the formula:

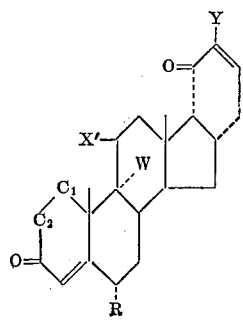

wherein R is selected from the class consisting of hydrogen, fluorine, and methyl, W is selected from the class consisting of hydrogen and fluorine, X' is an 11-substituent selected from the class consisting of hydrogen, keto, and α- and β-hydroxy, and X' and W taken together represent a 9(11)-double bond, Y is selected from the class consisting of hydrogen, hydroxy, and acyloxy wherein the acyl radical is that of a hydrocarbon carboxylic acid containing from 1 to 12 carbon atoms, inclusive, and —C₁—C₂— is a divalent radical selected from the class consisting of —CH₂—CH₂— and —CH=CH—, with a dehydrogenation catalyst in the presence of a hydrogen acceptor to obtain the corresponding androstano-[16,17-1',2']-benzene having the formula:

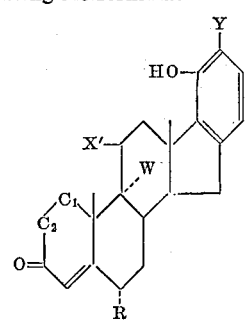

wherein R, W, X', Y and —C₁—C₂— have the significance above defined.

9. A process comprising the steps of subjecting a 2'-substituted - 6'β - alkoxy - 5'6' - dihydroandrostano-[17,16α-c]-pyran having the formula:

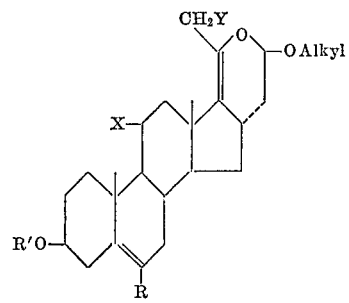

wherein R is selected from the class consisting of hydrogen and methyl, X is an 11-substituent selected from the class consisting of hydrogen, keto, α-hydroxy, β-hydroxy, and a 9(11)-double bond, R' is selected from the class consisting of hydrogen and the acyl radical of a hydrocarbon carboxylic acid containing from 1 to 12 carbon atoms, inclusive, and Y is selected from the class consisting of hydrogen, hydroxy, and acyloxy wherein the acyl is as defined above, to hydrolysis in the presence of a strong non-oxidizing acid to obtain a compound having the formula:

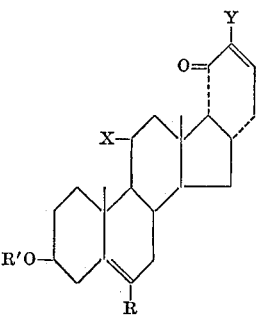

wherein R, R', X and Y have the significance above defined, and heating the latter compound with a dehydrogenation catalyst in the presence of a hydrogen acceptor to obtain the corresponding androstano-[16,17-1',2']-benzene having the formula:

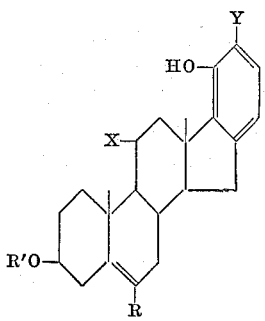

wherein R, R', X and Y have the significance above defined.

10. A process comprising subjecting a compound having the formula:

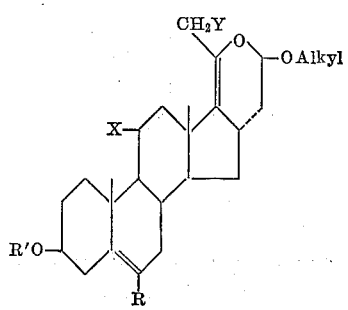

wherein R is selected from the class consisting of hydrogen and methyl, X is an 11-substituent selected from the class consisting of hydrogen, keto, α-hydroxy, β-hydroxy, and a 9(11)-double bond, R' is selected from the class consisting of hydrogen and the acyl radical of a hydrocarbon carboxylic acid containing from 1 to 12 carbon atoms, inclusive, and Y is selected from the class consisting of hydrogen, hydroxy, and acyloxy wherein the acyl is as defined above, to hydrolysis in the presence of a strong non-oxidizing acid to obtain a compound having the formula:

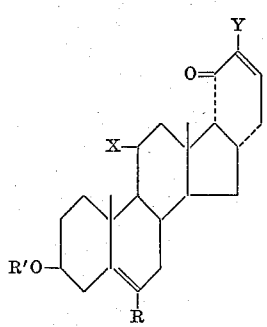

wherein R, R', X and Y have the significance above defined.

11. A process comprising heating a compound having the formula:

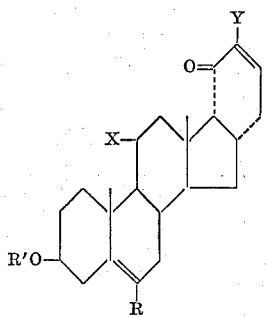

wherein R is selected from the class consisting of hydrogen and methyl, X is an 11-substituent selected from the class consisting of hydrogen, keto, α-hydroxy, β-hydroxy, and a 9(11)-double bond, R' is selected from the class consisting of hydrogen and the acyl radical of a hydrocarbon carboxylic acid containing from 1 to 12 carbon atoms, inclusive, and Y is selected from the class consisting or hydrogen, hydroxy, and acyloxy the acyl is as defined above, with a dehydrogenation catalyst in the presence of a hydrogen acceptor to obtain the corresponding androstano-[16,17-1',2']-benzene having the formula:

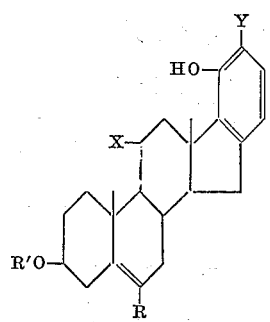

wherein R, R', X and Y have the significance above defined.

12. A process comprising the steps of subjecting a compound having the formula:

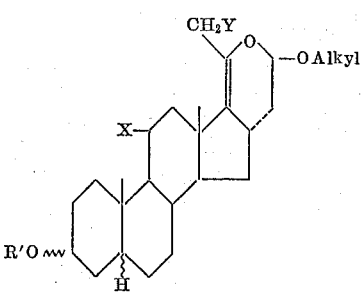

wherein R' is selected from the class consisting of hydrogen and the acyl radical of a hydrocarbon carboxylic acid containing from 1 to 12 carbon atoms, inclusive, X is an 11-substituent selected from the class consisting of hydrogen, keto, α-hydroxy, β-hydroxy, and a 9(11)-double bond, and Y is selected from the class consisting of hydrogen, hydroxy, and acyloxy wherein the acyl is as defined above, to hydrolysis in the presence of a strong non-oxidizing acid to obtain a compound having the formula:

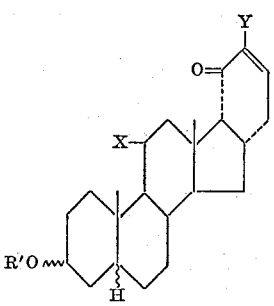

wherein R', X, and Y have the significance above defined, and heating the latter compound with a dehydrogenation catalyst in the presence of a hydrogen acceptor to obtain the corresponding androstano-[16,17-1',2']-benzene having the formula:

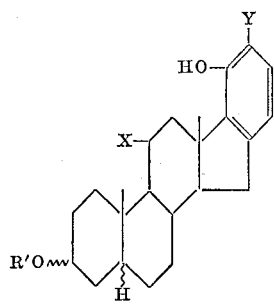

wherein R', X, and Y have the significance above defined.

13. A process comprising subjecting a compound having the formula:

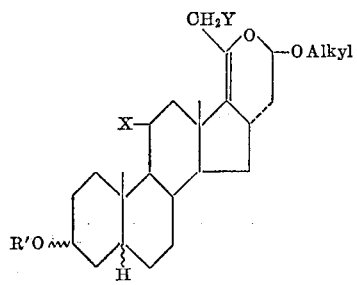

wherein R' is selected from the class consisting of hydrogen and the acyl radical of a hydrocarbon carboxylic acid containing from 1 to 12 carbon atoms, inclusive, X is an 11-substituent selected from the class consisting of hydrogen, keto, α-hydroxy, β-hydroxy, and a 9(11)-double bond, and Y is selected from the class consisting of hydrogen, hydroxy, and acyloxy wherein the acyl is as defined above to hydrolysis in the presence of a strong non-oxidizing acid to obtain a compound having the formula:

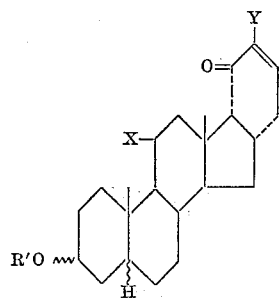

wherein R', X, and Y have the significance above defined.

14. A process comprising heating a compound having the formula:

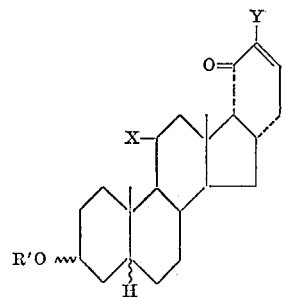

wherein R' is selected from the class consisting of hydrogen, and the acyl radical of a hydrocarbon carboxylic acid containing from 1 to 12 carbon atoms, inclusive, X is an 11-substituent selected from the class consisting of hydrogen, keto, α-hydroxy, β-hydroxy, and a 9(11)-double bond, and Y is selected from the class consisting of hydrogen, hydroxy, and acyloxy wherein the acyl is as defined above, with a dehydrogenation catalyst in the presence of a hydrogen acceptor to obtain the corresponding androstano-[16,17-1',2']-benzene having the formula:

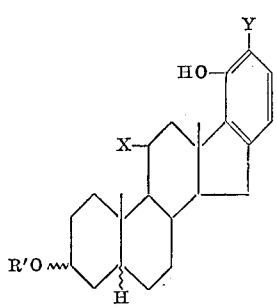

wherein R', X, and Y have the significance above defined.

15. A process comprising the steps of subjecting $\Delta^5$-3β-hydroxy-2'-methyl-6'β-methoxy-5',6' - dihydroandrostano-[17,16α-c]-pyran to hydrolysis in the presence of a strong non-oxidizing acid, acylating the 16α-ethyl-3β-hydroxy-16b,21-cyclopregna-5,16b(21)-diene-20-one so obtained to produce the corresponding 16α-ethyl-3β-hydroxy-16b,21-cyclopregna-5,16b(21)-diene-20-one 3β-acylate, and heating the latter compound with a dehydrogenation catalyst in the presence of a hydrogen acceptor to produce the corresponding 3β,3' - dihydroxy - $\Delta^5$ - androsteno-[16,17-1',2']-benzene 3β-acylate.

16. A process comprising the steps of subjecting $\Delta^5$-3β-hydroxy-2'-methyl-6'β-methoxy-5',6' - dihydroandrostano-[17,16α-c]-pyran to hydrolysis in the presence of sulfuric acid, reacting the 16α-ethyl-3β-hydroxy-16b,21-cyclopregna-5,16b(21)-diene-20-one so obtained with acetic anhydride in the presence of pyridine to produce the corresponding 16α-ethyl-3β-hydroxy-16b,21-cyclopregna-5,16b(21)-diene-20-one 3β-acetate, and heating the latter compound with palladium-on-charcoal in the presence of p-cymene to produce 3β,3' - dihydroxy - $\Delta^5$ - androsteno-[16,17-1',2']-benzene 3β-acetate.

17. A process comprising heating 16α-ethyl-3β-hydroxy-16b,21-cyclopregna-5,16b(21)-diene-20-one 3β - acylate, wherein the acyl radical is that of a hydrocarbon carboxylic acid containing from 1 to 12 carbon atoms, inclusive, with a dehydrogenation catalyst in the presence of a hydrogen acceptor to produce the corresponding 3β,3'-dihydroxy-$\Delta^5$-androsteno-[16,17-1',2']-benzene 3β-acylate.

18. A process comprising heating 16α-ethyl-3β-hydroxy-16b,21 - cyclopregna - 5,16b(21)-diene-20-one 3β-acetate with palladium-on-charcoal in the presence of p-cymene to produce 3β,3' - dihydroxy-$\Delta^5$-androsteno-[16,17-1',2']-benzene 3β-acetate.

No references cited.

LEWIS GOTTS, Primary Examiner.